Feb. 25, 1941.   G. A. TINNERMAN   2,233,230
FASTENING DEVICE
Filed Jan. 21, 1939

INVENTOR.
GEORGE A. TINNERMAN
BY Bates, Goldrick & Teare
ATTORNEYS

Patented Feb. 25, 1941

2,233,230

UNITED STATES PATENT OFFICE 2,233,230

FASTENING DEVICE

George A. Tinnerman, Rocky River, Ohio, assignor, by mesne assignments, to Tinnerman Products, Inc., Cleveland, Ohio, a corporation of Ohio Application January 21, 1939, Serial No. 252,112

3 Claims. (Cl. 85—32)

This invention relates to devices for fastening together superimposed parts, such as sheet-metal members, and particularly to a device which will automatically center itself in bolt-receiving position.

The present invention comprises an improvement on that shown and claimed in my United States Patent No. 2,101,287, issued November 7, 1937, on a Fastening device. The fastener illustrated in that patent has two arms that are formed by bending a sheet metal strip intermediate its ends so that one arm overlies the other in spaced relationship and is substantially the same in length as the other arm. Such fastener operates to center itself automatically in bolt receiving position with respect to the bolt opening in one of the parts to be joined, but in many instances of use, particularly in refrigerator door assemblies, the arrangement of parts does not readily permit the introduction of the fastener. Moreover, some difficulty has been experienced in making a fastener that is equally adapted for inserting and fastening it with the desired degree of clamping pressure against parts which differ in thickness. For example, when a sheet metal plate is used as one of the parts to be joined, the practice has been to space the arms of the fastener apart by an amount which is intended to provide a snug fit between the arms and the opposite sides of the plate. Consequently a fastener designed for one thickness of plate would not operate satisfactorily on a plate of different thickness.

An object of the present invention therefore is to make a sheet metal fastener in such manner that it may be used satisfactorily in all types of assemblies and which will automatically center itself with respect to the bolt opening in the assembly of the parts, and will automatically lock itself in bolt receiving position whereby the bolt may be inserted without requiring an operator to hold the fastener while the bolt is being threaded into it.

A further object of the present invention is to reduce the amount of metal that is required to make the fastener and thereby to effect economy of construction.

An additional object is to make a fastener which can be applied with equal satisfaction to plates of different thickness and which when so applied will grip the plate with adequate force to hold it firmly in bolt receiving position.

Figure 1:
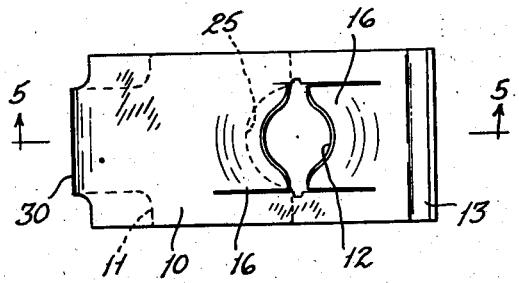
Figure 2:
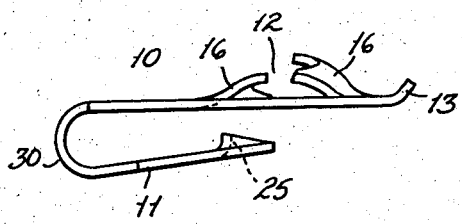
Figure 3:
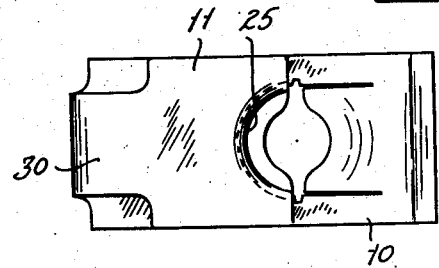
Figure 4:
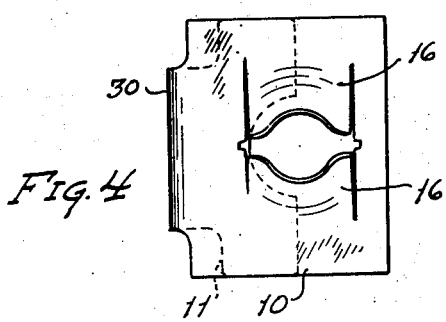
Figure 5:
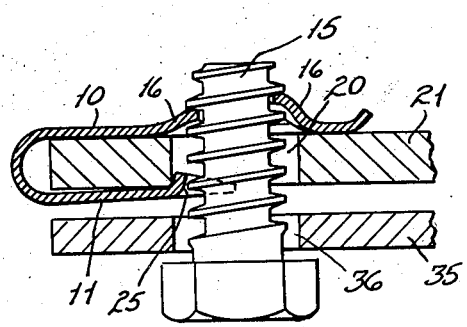
Figure 6:
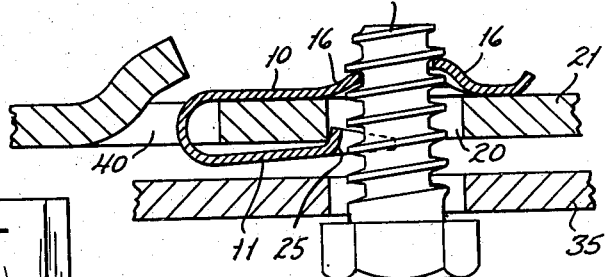
Figure 7:
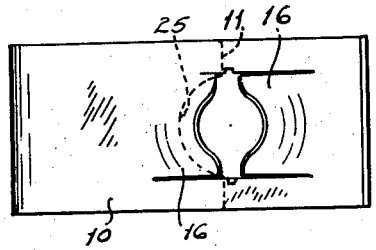

Referring now to the drawing, Fig. 1 is a top plan view of a fastener made in accordance with my invention; Fig. 2 is a side view of the fastener; Fig. 3 is a bottom view of the fastener; Fig. 4 is a top plan view of a modified form of construction; Fig. 5 is a sectional view showing the fastener applied to the edge of a support for securing a cooperating part thereto; Fig. 6 shows a section illustrating the fastener applied to a support through an assembling slot, and Fig. 7 is a top plan view of a fastener embodying a further modification of my invention.

The fastener with which I have shown my invention comprises a strip of sheet-metal which is bent intermediate its ends to provide two arms, one of which is indicated at 10 and the other at 11. These arms, for some portions thereof, are substantially equal in width and are spaced apart a distance that corresponds to the range of thickness of the parts with which the fastener is intended for use. The arm 10 has a bolt-receiving opening 12 therein and has a portion adjacent the opening arranged to engage the thread of a bolt 15 with which the fastener is intended to be used. In the form illustrated, the thread-engaging portion comprises tongues 16 that are integral with the body 10, and that have the ends thereof shaped to conform to the helix of the thread on the bolt with which the fastener is intended to be used. I am not concerned in this application with the particular shape or configuration of the deformed portions 16 because the present invention is applicable to sheet-metal fasteners, regardless of the construction of the deformed threaded portions.

For centering the fastener automatically with the bolt opening in the parts to be joined, such as the opening 20 in the part 21, I prefer to terminate the arm 11 underneath the opening 12 and to provide a notch 25 therein in registration with the opening 12. A portion of the arm 11 adjacent the end thereof, is deformed therefrom and provides a projection which is adapted to enter the opening and to clear the shank of the bolt 15.

To facilitate the attachment of the fastener to sheet-metal plates or other articles of different thickness, I may make the connecting portion 30 between the arms 10 and 11 of reduced width as shown in Figs. 1 to 3 so as to increase the flexibility of the arms and to expedite the application thereof for attachment to an article. Additionally, the arm 10 may have the outer end thereof curved upwardly as at 13, Fig. 1, to facilitate the entrance of the parts to be joined.

In Fig. 4, I have shown a modified form of construction wherein the arm 10 has the tongues 16 extending crosswise of the strip instead of lengthwise as shown in Fig. 1. In all other respects the fastener construction is the same as that in Fig. 1.

In Fig. 5, I have shown the fastener applied over the edge of part 21 for securing cooperating part 35 thereto. The part 35 has an opening 36 in registration with the opening 20 for receiving the shank of the bolt 15. In Fig. 6, the fastener is shown as attached to the part 21, and in this case, the fastener is first inserted through the assembling slot 40 that is provided in the part 21, and through which the fastener is passed for attachment to the part 21. After such assembly has been made, the bolt and the part 35 are pressed against the arm 11 and the bolt is turned into place.

In Fig. 7, I have shown a modified form of construction wherein the parts are the same as for the fastener illustrated in Figs. 1 to 3 inclusive, except for the fact that the connecting portion of the arms 10 and 11 is not reduced in width. It is to be noted, however, that the end of the arm 11 terminates beneath the bolt receiving opening and that centering and holding means, in the form of a protuberance or projection 25, is shown adjacent the notched end of the arm 11, as is illustrated in Figs. 1, 2 and 3.

An advantage of the present invention is the fact that one of the arms is materially shorter than the other, and yet the fastener is adapted to center itself automatically when attached to one of the parts to be joined.

The use of the reduced portion connecting the arms is helpful in that it increases the flexibility of the arms and facilitates their attachment to the part to be joined. Additionally the added flexibility extends the use of the fastener to cover a range of parts having different thickness.

I claim:

1. A fastening device comprising a strip of sheet metal providing a pair of arms of unequal length extending in the same general direction and adapted to receive an apertured part therebetween, the longer arm carrying bolt or screw engaging means adapted to overlie the aperture in said part in fastening position, the shorter arm terminating below said bolt or screw engaging means such that the aperture in said part is visible during the application of the fastening device to fastening position, and means on one of said arms designed to engage in the aperture in said part for maintaining said bolt or screw engaging means carried by the longer arm in registration with said aperture in such applied fastening position.

2. A fastening device comprising a strip of sheet metal providing a pair of arms of unequal length extending in the same general direction and adapted to receive an apertured part therebetween, the longer arm carrying bolt or screw engaging means adapted to overlie the aperture in said part in fastening position, the shorter arm terminating below said bolt or screw engaging means such that the aperture in said part is visible during the application of the fastening device to fastening position, and means on said shorter arm designed to engage in the aperture in said part for maintaining the bolt or screw engaging means carried by the longer arm in registration with said aperture in such applied fastening position.

3. A fastening device comprising a strip of sheet metal providing a pair of arms of unequal length extending in the same general direction and adapted to receive an apertured part therebetween, the longer arm carrying bolt or screw engaging means adapted to overlie the aperture in said part in fastening position to receive a stud fastener applied through said aperture, the shorter arm terminating below said bolt or screw engaging means such that the aperture in said part is visible during the application of the fastening device to fastening position, said shorter arm having its free end provided with an opening to clear the stud fastener, said opening having a bent marginal edge portion providing a projection adapted to engage in the aperture in said part in applied fastening position.

GEORGE A. TINNERMAN.